No. 682,246. Patented Sept. 10, 1901.
J. W. EVERHART.
JAR COVER AND CLAMP.
(Application filed Dec. 10, 1900.)
(No Model.)

WITNESSES.
Nellie Cilley.
Lottie Patterson.

INVENTOR.
John W. Everhart.
By Ithiel J. Cilley
ATTORNEY.

UNITED STATES PATENT OFFICE.

JOHN W. EVERHART, OF GRAND RAPIDS, MICHIGAN.

JAR COVER AND CLAMP.

SPECIFICATION forming part of Letters Patent No. 682,246, dated September 10, 1901.

Application filed December 10, 1900. Serial No. 39,420. (No model.)

*To all whom it may concern:*

Be it known that I, JOHN W. EVERHART, a citizen of the United States, residing at Grand Rapids, in the county of Kent and State of Michigan, have invented certain new and useful Improvements in Jar Covers and Clamps, of which the following is a specification.

My invention relates to improvements in appliances for securing covers upon jars, &c.; and its object is to provide a cover and clamp that will securely fasten the cover upon the jar and may at the same time be used as a bail or handle for carrying the jar. I attain this object by the mechanism illustrated in the accompanying drawings, in which—

Figure 1:
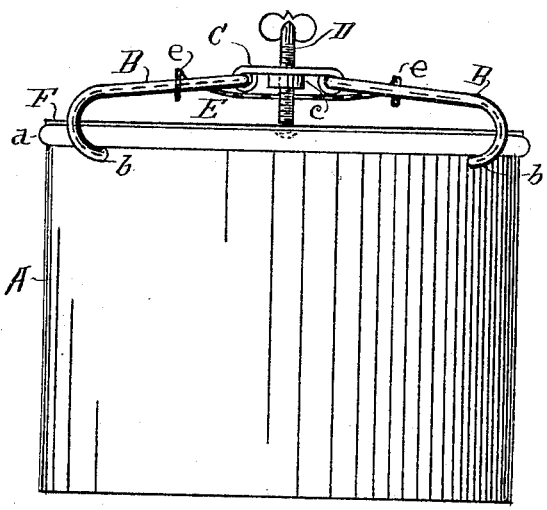
Figure 2:
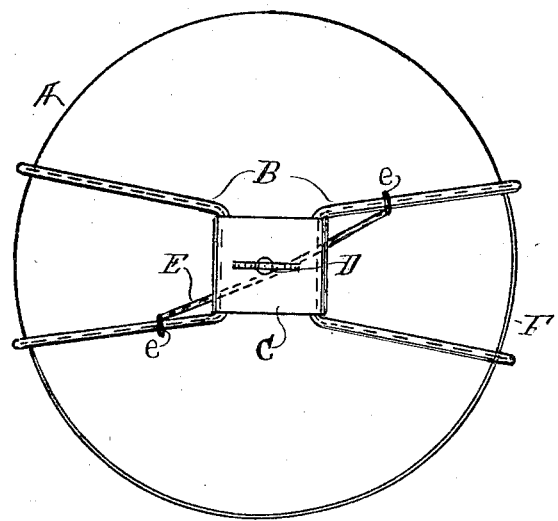
Figure 3:
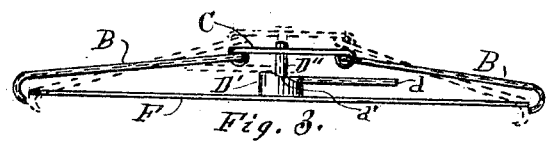

Figure 1 is an elevation of a jar with my appliance attached, and Fig. 2 is a top plan of the same. Fig. 3 shows a modified form of screw.

Similar letters refer to similar parts throughout the several views.

A represents the jar.

B is a clamp formed of suitable wire bent to form clamping ends, as $b$, which are designed to clamp under the bead $a$ at the top of the jar. There are two of these clamps consisting of two arms each, as indicated in Fig. 2, bent to form an adjustable bearing in the base C, which is formed around the wire in such a manner that the wire will turn therein freely. By this means the arms are so adjusted that they have four bearings upon the bead. The thumb-screw D passes through the nut $c$ on the lower side of the base C and passes down and bears upon the center of the cover F, so that the screwing of the hand-screw upon the cover will raise the center plate or base C from the cover, and as a consequence the ends of the clamps B will be drawn together against the edges of the jar as solidly as may be desired or as the cover of the jar may be able to sustain. When securely drawn to place, the arms may be used as a bail or handle with which to carry the jar.

If it is desired to use this clamp upon a bottle, jelly-cup, or a small-topped jar, it is simply necessary to make the arms shorter. As constructed for an ordinary jar, the screw may be made long enough to give considerable variation to the sizes of jars to be covered and secured with this cover and clamp.

The thumb-screw D may pass through the cover F, as indicated by the dotted lines in Fig. 1, and be there riveted, so that the cover will be permanently secured to the screw and will be removed with the clamp.

I find the spring E a very desirable acquisition to the arms of the clamp, as it tends to hold the ends $b$ against the periphery of the jar when being applied and the screw is being adjusted to press the cover down and draw the ends solidly to place against the periphery of the jar, as hereinbefore described.

In Fig. 3 I have shown an incline D', having a post D'', which is provided with a lever $d$, that is designed to travel up on the incline and raise the post, and with it the base C, in lieu of the like action of the several turns required to perform the same action with a fine-threaded screw. The actions of both are identical, except that it requires several turns of the screw proper, while a half-turn of the lever upon the incline will suffice to raise the base as high as necessary. I find it well to provide the incline with an intermediate notch, as at $d'$, so that it may be adjusted to the requirements of covers of different size or resistance.

Having thus fully described my invention, what I claim as new, and desire to secure by Letters Patent of the United States, is—

In combination with a jar and jar-cover, a central nut, a base, arms pivoted to each end of the base and extending thence to the periphery of the cover, hooks formed at the ends of said arms, a spring passing under the base and over the arms at each end of the base, and a screw, substantially as and for the purpose set forth.

Signed at Grand Rapids, Michigan, December 8, 1900.

JOHN W. EVERHART.

In presence of—
ITHIEL J. CILLEY,
A. L. CRAWFORD.